July 15, 1952 W. H. HARSTICK 2,603,473
CENTRIFUGAL GUIDED SPEED RESPONSIVE DEVICE WITH SPRING SUPPORT
Filed Sept. 8. 1948
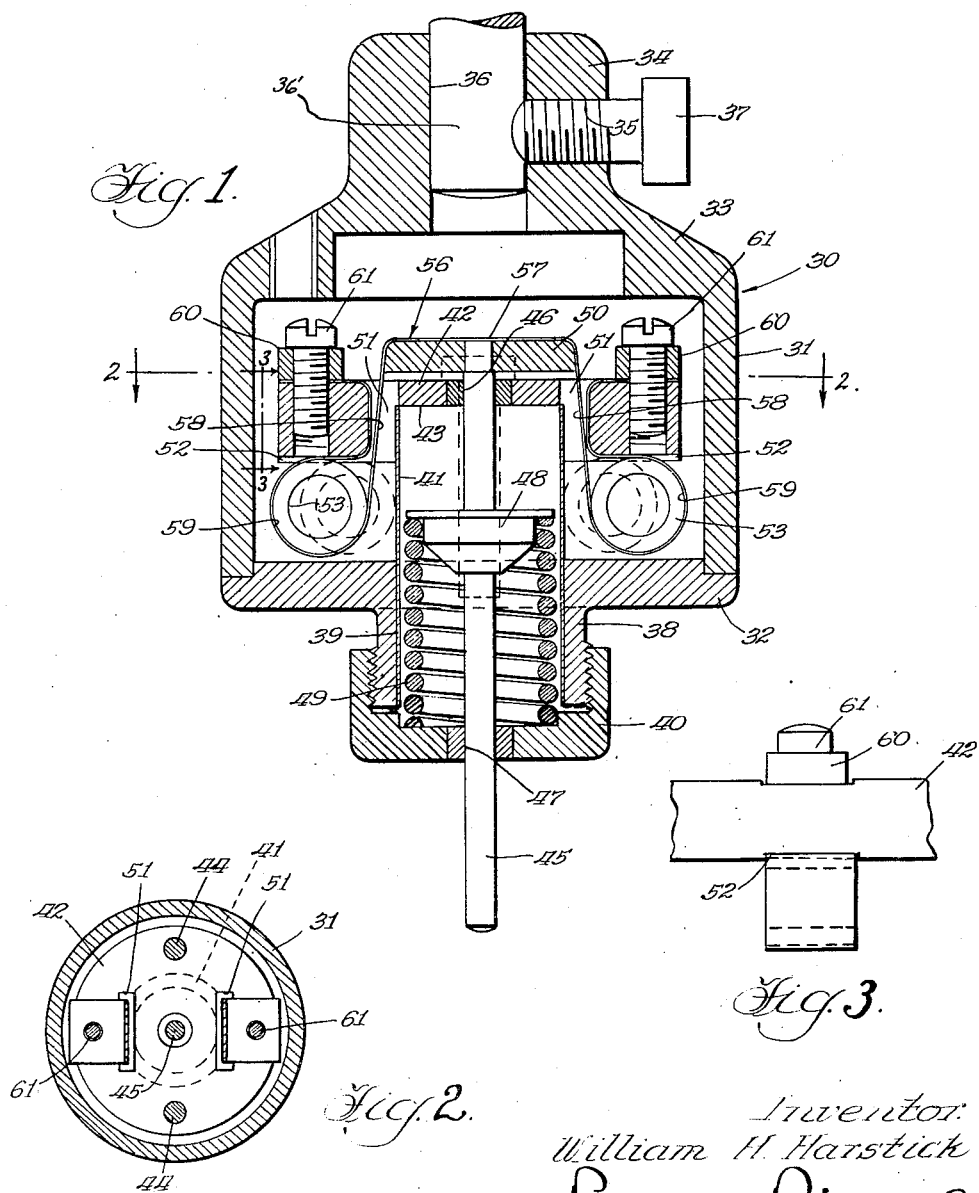
Inventor:
William H. Harstick Patented July 15, 1952

2,603,473

UNITED STATES PATENT OFFICE 2,603,473

CENTRIFUGAL GUIDED SPEED RESPONSIVE DEVICE WITH SPRING SUPPORT

William H. Harstick, Oak Park, Ill., assignor to International Harvester Company, a corporation of New Jersey Application September 8, 1948, Serial No. 48,241

5 Claims. (Cl. 264—17)

1

This invention relates to a governor and more particularly to a governor adapted to actuate a switch controlling the supply of electrical energy to a high-speed electric motor.

The uses and limitations of high-speed electric motors are well known to those skilled in the art. High-speed series wound motors are utilized in many appliances and mechanisms where maximum speeds of rotation are desirable. This is especially true in the manufacture of cream separators where the separating bowl is generally rotated around 10,000 R. P. M. A high-speed electric motor may thus be directly connected to the separating bowl in order to maintain the high speed of rotation that the separating operation requires. In order to secure proper separation it is required that the rotation of the bowl be maintained at a constant speed with a minimum of variations. In various other appliances where high-speed electric motors are utilized it is likewise desirable to keep speed variations at a minimum. In order to accomplish this desirable feature, various types of fluid and mechanical governors have been utilized. Many of these types of governors have not proven satisfactory since they have been subject to inherent difficulties both from a service and an operating standpoint.

Fluid governors have been found especially susceptible to atmospheric changes, thus creating a speed variation in addition to the variations inherently found in the high-speed electric motor. Changes in line voltage may cause changes in speed of the rotation of the motor. Likewise, excessive wear such as is occasioned by the pitting of the commutator bars due to sparking is a cause for unequal operation. Aside from these possible variations in the speed of rotation there are also, of course, the load variations which may cause unequal operation. This is especially true in a mechanism such as a cream separator where the amount of whole milk to be separated may have different densities and where changes in the quantity bring about different load characteristics. It is applicant's prime object, therefore, to provide a novel improvement in mechanical governors of a type utilized for controlling and governing a high-speed electric motor.

It is another object to provide a mechanical governor adapted to control the speed of an electric motor, said governor having operating characteristics enabling the electric motor to be operated at a desirable constant speed despite inherent variations and changes in the load characteristics.

Another object is to provide an improved speed

2 governor adapted to control an electric motor, the governor containing a minimum of parts, thereby greatly minimizing the friction within the governor.

Another object is to provide an improved mechanical speed governor that may operate over long periods of time without service and which need not be lubricated.

A still further object is to provide an improved mechanical speed governor for a high-speed electric motor, said governor including a rotatable casing having a pair of governor weights therein which are adapted to be guided and moved outwardly and inwardly on a pair of radially extending tracks for reciprocating a plunger which is adapted to actuate a switch.

These and other objects will become more clearly apparent upon reading the specification when examined in connection with the drawing.

In the drawing:

Fig. 1 is a sectional view through a speed governor showing the embodiments of the invention.

Fig. 2 is a sectional view of a governor taken along the line 2—2 of Fig. 1.

Fig. 3 is a fragmentary view taken along the line 3—3 of Fig. 1.

As best shown in Fig. 1 a speed regulator, or governor, is generally designated by the reference character 30. The speed governor 30 includes a cylindrical housing or casing 31 which consists of a base 32 and an upper cover or cylindrical closure member 33. The upper end of the closure member 33 is provided with a collar 34 having a laterally extending threaded bore 35. A vertical bore 36 is centrally positioned and in communication with the bore 35. As shown in Fig. 4 the vertical bore 36 is adapted to telescopingly contact the lower end of an armature shaft 36' of an electric motor (not shown). A set screw 37 may be tightened in the lateral bore 35 for securing the governor 30 to the lower end of the armature shaft 36'.

The base 32 is provided with a downwardly extending projection 38 having a centrally disposed vertical bore 39. The projection 38 is threaded on its exterior surface and may be engaged by a cap or cover 40.

A tubular member 41 is rigidly secured in the bore 39. The tubular member may be secured by brazing or welding, or the tubular member may be integrally formed with the base 32. The tubular member 41 extends upwardly into the casing 31 and supports at its upper end an annular guide member 42. The guide member 42 may be in the shape of a disk and includes an undercut portion 43 which snugly fits about the upper portion of the tubular member 41. The guide member 42 is secured to the base 32 of the governor by means of laterally spaced machine screws 44 which extend into the base 32.

A plunger or vertical contact member 45 is positioned for reciprocation within the casing 31. The plunger 45 has its upper end extending through an opening 46 centrally formed in the guide member 42. An opening 47 in the cap 40 is in axial alignment with the opening 46 and the lower end of the plunger 45 projects outwardly through this opening. The plunger 45 is provided with an annular collar 48 positioned within the tubular member 41. The collar 48 is rigidly secured to the plunger 45 and is engaged by spring 49. The spring 49 tends to urge the plunger 45 in an upward direction. The cap 40 may be turned and then adjusted to vary the tension on the spring 49 for controlling the operating speed of the governor. The upper end of the plunger is provided with a substantially flat head 50 which is adapted to reciprocate with the plunger.

A pair of slots or openings 51, best shown in Figure 2, are formed in the guide member 42. The slots are disposed at opposite sides of the plunger 45 and extend completely through the guide member 42. Immediately adjacent the slots a pair of tracks 52 are formed in the underneath surface of the guide member 42. The tracks 52 are in the form of recesses which have been cut in the under surface of the guide member 42.

Governor weights 53 are disposed at opposite sides of the plunger 45. The governor weights 53 are cylindrical in shape and include centrally disposed bores or openings 53'. A flexible band 56, of spring-like material, operatively connects the governor weights 53 to the plunger 45. The flexible band is of U-shaped character and includes a horizontal portion 57 which lies on the plunger head 50. The band 56 also includes downwardly extending leg portions 58 which extend through the slots or openings 51. The leg portions 58 include end portions 58 which are wrapped about or partially curl and encircle the cylindrical governor weights 53. The end portions 59 extend within the tracks 52, upwardly through the slots 51 for connection to the upper surface of the guide 41 by means of washers 60 and screws 61.

During the operation of an electric motor it may be desirable to maintain a constant speed of 10,000 R. P. M. especially if the motor is utilized in connection with a cream separator or other centrifugal separating device. The governor weights 53 are readily susceptible to the centrifugal forces occasioned by the rotation of the governor casing 31. As the motor tends to increase in speed of rotation beyond 10,000 R. P. M. due to load variations, etc., the governor weights are moved laterally outwardly on the recessed tracks 52. The movement of the governor weights is at all times within the tracks and as the weights are moved radially outwardly the horizontal portion 57 of the flexible band 56 is moved downwardly, thus exerting a downward force on the plunger 45. The downward force of the plunger 45 is against the action of the spring 49, which tends to urge the plunger upwardly. As the plunger 45 is moved downwardly it is adapted to engage an electrical switch to break an electrical circuit to a motor thereby causing the motor to slow up. As the speed of the motor decreases the governor weights 53 move inwardly on the tracks 52 and the spring 49 pushes the plunger 45 upwardly, whereupon a switch may again be closed to provide current to the motor for again speeding up the motor. The speed of the motor can thus be kept relatively constant.

In view of the novel design applicant's governor is capable of maintaining the speed of rotation of the motor constant within 1% of the speed of rotation. The governor weights 53 are arranged to rotate within the circling or curled end portions 59 of the flexible band 57. The inward and outward movement of the governor weights is within the recessed tracks 52 and thus the governor weights cannot be laterally displaced despite the high speed of rotation of the governor. The governor casing 31 is constantly rotating with the armature shaft 36'. An ever increasing speed of the electric motor will immediately cause movement of the governor weights until the governing action of the motor is obtained by the actuation of a switch as described.

The operation of the governor weights and the arrangement of parts is such that a minimum of friction is inherent in the operation. Thus, a governor of this type need not be lubricated nor serviced and constant positive operation is afforded by the novel arrangement of the rotating cylindrical governor weights which are movable within the recessed tracks. The flexible element or band 57 permits the governor weights to rotate during the inward or outward movement of the weights and any movement of the weights is immediately effective to react against the reciprocating plunger 45.

It can now be seen that an effective and novel governing device has been described which will readily accomplish the desirable objects of the invention. It must be understood that changes and modifications may be made which do not depart from the spirit of the invention nor the scope thereof as defined in the appended claims.

What is claimed is:

1. In a speed governor having a casing adapted to be connected to the drive shaft of a high speed electric motor; means for controlling the speed of the motor comprising a plunger within said casing, said plunger being arranged to reciprocate and having a portion extending outwardly of the casing, a resilient member for normally urging the plunger to move with respect to the housing, a guide member within the casing, said guide member having a pair of transversely spaced axially extending openings, recessed tracks formed in a surface of said guide member, said track being disposed on opposite sides of the plunger and extending laterally outwardly with respect thereto, a pair of cylindrical governor weights disposed within the tracks, a continuous flexible band freely engaging the upper end of said plunger, said band extending through the openings and having portions substantially encircling the governor weights, means connecting the ends of said band to said guide member, said weights being arranged to roll laterally in said tracks with respect to said plunger and in response to varying speeds of rotation of said casing whereby said plunger is moved against the resilient pressure of said resilient member.

2. In a speed governor having a casing adapted to be connected to the drive shaft of a high speed electric motor; means for controlling the speed of the motor comprising a plunger within said casing, said plunger being arranged to reciprocate and having a portion extending outwardly of the casing, a resilient member for normally urging the plunger to move with respect to the housing, a guide member within the casing, said guide member having a pair of transversely spaced axially extending openings, recessed tracks formed in a surface of said guide member, said tracks extending laterally with respect to said plunger, a pair of cylindrical governor weights disposed within the tracks, a flexible band engaging the upper end of said plunger, said band extending through the openings and having portions partially encircling the governor weights, means connecting the ends of said band to said casing, said weights being arranged to move laterally in said tracks with respect to the plunger and in response to varying speeds of rotation of said casing whereby said plunger is moved against the resilient pressure of said resilient member.

3. In a speed governor having a cylindrical housing adapted to be connected to the drive shaft of a high speed electric motor; means for controlling the speed of the motor comprising a tubular member axially positioned within the housing, a plunger positioned for axial reciprocation within said tubular member said plunger projecting outwardly from said tubular member and said housing, a resilient member within said tubular member and engaging said plunger for normally urging the same in one direction with respect to said housing, a guide member within said housing, said guide member having a pair of openings disposed at opposite sides of said tubular member, recessed tracks formed in a surface of said guide member, said tracks extending laterally outwardly from the openings in said guide member, a pair of cylindrical governor weights disposed at opposite sides of said tubular member, a continuous flexible band engaging the upper end of said plunger, said band having portions extending through the openings in said guide members for substantially encircling portions of said governor weights, and means connecting the ends of said band to said guide member, portions of said band being contained within said track, said weights being adapted to roll laterally within the tracks with respect to the plunger during rotation of said housing whereby said plunger is moved in a second direction.

4. In a speed governor having a casing adapted to be connected to the drive shaft of a high speed electric motor for rotation with the shaft; means for controlling the speed of the motor comprising a plunger positioned for reciprocation within the casing, a resilient member engaging the plunger for normally urging the plunger in a first direction, said plunger including a head portion extending laterally with respect to the plunger, a guide member having portions disposed on opposite sides of the plunger, said portions each including an axially extending opening, a recess formed in each guide portion, said recesses being in lateral alignment and extending laterally with respect to the plunger to provide a pair of tracks, a pair of cylindrical governor weights positioned for movement in said tracks, a continuous flexible U-shaped band having a portion freely engaging the head portion of the plunger, said band having second portions extending through the openings in said guide members, said second portions encircling portions of the governor weights, and means connecting the second portion of said band to said guide member, said weights being adapted to roll laterally in said tracks with respect to said plunger and in response to varying speeds of rotation of said casing whereby said plunger is moved against the resilient pressure of said resilient member.

5. In a speed governor having a casing adapted to be connected to the drive shaft of a high speed electric motor for rotation with the shaft; means for controlling the speed of the motor comprising a plunger positioned for reciprocation within the casing, a resilient member engaging the plunger for normally urging the plunger in a first direction, a guide member having portions disposed on opposite sides of the plunger, said portions each including an axially extending opening, a recess formed in each guide portion, said recesses being in lateral alignment and extending laterally with respect to the plunger to provide a pair of tracks, a pair of cylindrical governor weights positioned for movement in said tracks, a continuous flexible band having a portion engaging the plunger, said band having second portions extending through the openings in said guide member, said second portions substantially encircling the govenor weights, and means connecting the second portion of said band to said guide member, said weights being adapted to roll laterally in said tracks with respect to said plunger and in response to varying speeds of rotation of said casing whereby said plunger is moved against the resilient pressure of said resilient member.

WILLIAM H. HARSTICK.

REFERENCES CITED

The following references are of record in the file of this patent:

UNITED STATES PATENTS

| Number | Name | Date |
|---|---|---|
| 1,464,749 | Dahlstrand | Aug. 14, 1923 |
| 1,488,469 | Blake | Apr. 1, 1924 |
| 2,141,772 | Stadler | Dec. 27, 1938 |
| 2,146,046 | Bancroft | Feb. 7, 1939 |
| 2,187,202 | Henry | Jan. 16, 1940 |
| 2,395,885 | Lambert | Mar. 5, 1946 |

FOREIGN PATENTS

| Number | Country | Date |
|---|---|---|
| 305,360 | Germany | May 1, 1918 |
| 2,388 | Great Britain | June 12, 1880 |